Figure 1:
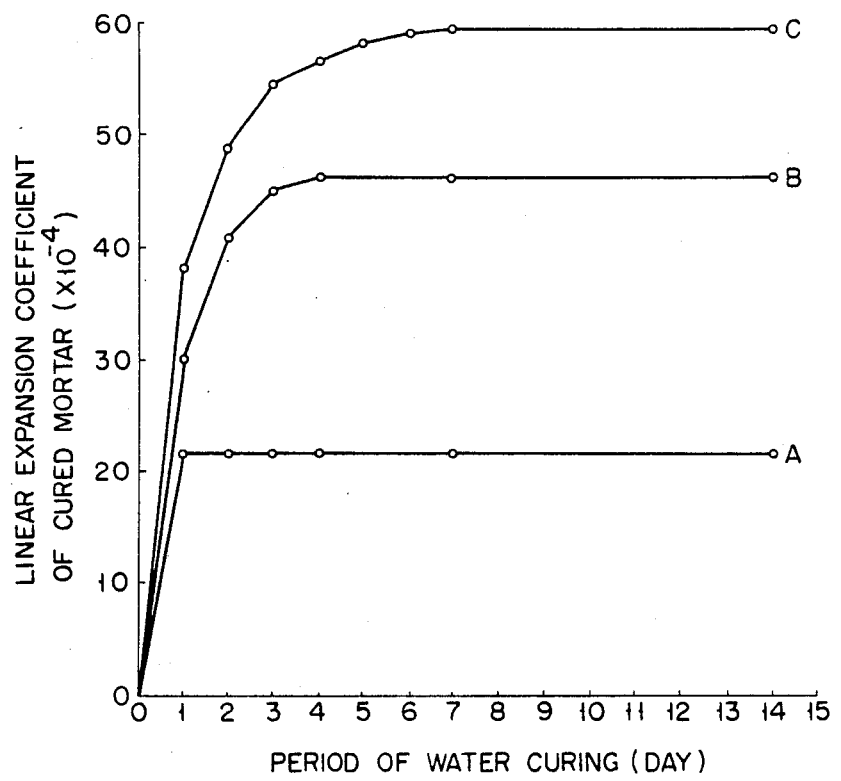

United States Patent [19]
Kawano

[11] 3,785,844
[45] Jan. 15, 1974

[54] EXPANSIVE CEMENT ADDITIVES AND PROCESS FOR PRODUCING THE SAME

[75] Inventor: Toshio Kawano, Kawasaki, Japan

[73] Assignee: Onoda Cement Co., Ltd., Yamaguchi-ken, Japan

[22] Filed: Nov. 8, 1972

[21] Appl. No.: 304,817

[30] Foreign Application Priority Data
Nov. 13, 1971 Japan.............................. 46-90749
Mar. 17, 1972 Japan.............................. 47-27304

[52] U.S. Cl..................... 106/314, 106/89, 106/110
[51] Int. Cl............................................. C04b 13/22
[58] Field of Search....................... 106/89, 100, 314

[56] References Cited
UNITED STATES PATENTS
2,465,278  3/1949  Schenker et al..................... 106/314
3,251,701  5/1966  Klein................................... 106/314
3,303,037  2/1967  Klein................................... 106/314
3,663,287  5/1972  Mizunuma et al.................. 106/314

Primary Examiner—James E. Poer
Attorney—Flynn & Frishauf

[57] ABSTRACT

A finely pulverized expansive cement additive having an excellent chemical prestressing property, a clinker of which consists of alite crystals and calcium oxide crystals dispersed in a vitreous interstitial substance, wherein said alite and calcium oxide crystals have a size ranging from 50 to 100 microns and from 15 to 60 microns respectively, and the content of said calcium crystals and said interstitial substance are from 30 to 80 percent and from 2 to 27 percent by weight based on the clinker respectively.

12 Claims, 5 Drawing Figures

EXPANSIVE CEMENT ADDITIVES AND PROCESS FOR PRODUCING THE SAME

This invention relates to expansive cement additives and more particularly to expansive cement additives which, when mixed with cement mortar or cement concrete, enable the mixture to retain a markedly excellent chemical prestressing property over a long period.

Heretofore, the conventional expansive cement additives have exclusively been used as a compensating agnet for the drying shrinkage of mortar and concrete. To date, there has been commercially available under the name of "Expansive Cement" a pulverized ternary mixture consisting of, for example, 65 to 70 percent by weight of Portland cement clinker, 10 to 20 percent by weight of blast furnace slag and 10 to 25 percent by weight of calcium sulfoaluminate clinker as an expansive additive.

As set forth, for example in the British Pat. No. 1,159,246, there has recently been proposed pulverized calcium sulfoaluminate clinker consisting of special proportions of components and having a particular particle size distribution. This powdered clinker is known to be used not only as a compensating agent for the drying shrinkage of cement, but also, when incorporated in larger amounts, is available as a chemical prestressing additive. However, the material has the drawbacks that increased application leads to economical disadvantage and, when cured, the cement containing said material is likely to decrease in mechanical strength, thus presenting great difficulties in effecting chemical prestressing.

It is accordingly an object of this invention to provide expansive cement additives, which enable even with small addition cured cement to preserve a prominent chemical prestressing property with little loss of mechanical strength.

Another object of the invention is to provide expansive cement additives enabling cured cement mortar or concrete to have a maximum expansion coefficient when cured with water for three to seven days.

These objects can be attained in accordance with the present invention by preparing a clinker as cement additive which essentially consists of alite ($3CaO \cdot SiO_2$) crystals and those of calcium oxide dispersed in a vitreous interstitial substance substantially formed of two phases of $4CaO \cdot Al_2O_3 \cdot Fe_2O_3$ and $3CaO \cdot Al_2O_3$ (hereinafter referred to as "$C_4Af$ phase" and "$C_3A$ phase" respectively), wherein said alite and calcium oxide crystals have a size of 50 to 200 microns and 15 to 60 microns respectively, and the content of said calcium oxide crystals and said vitreous interstitial substance range from 30 to 80 percent and from 2 to 27 percent by weight based on the clinker respectively.

Other important objects and advantageous features of this invention will be apparent from the following description and accompanying drawings, wherein, for the present purpose of illustration only, specific embodiments of this invention are set forth in detail.

Figure 2:
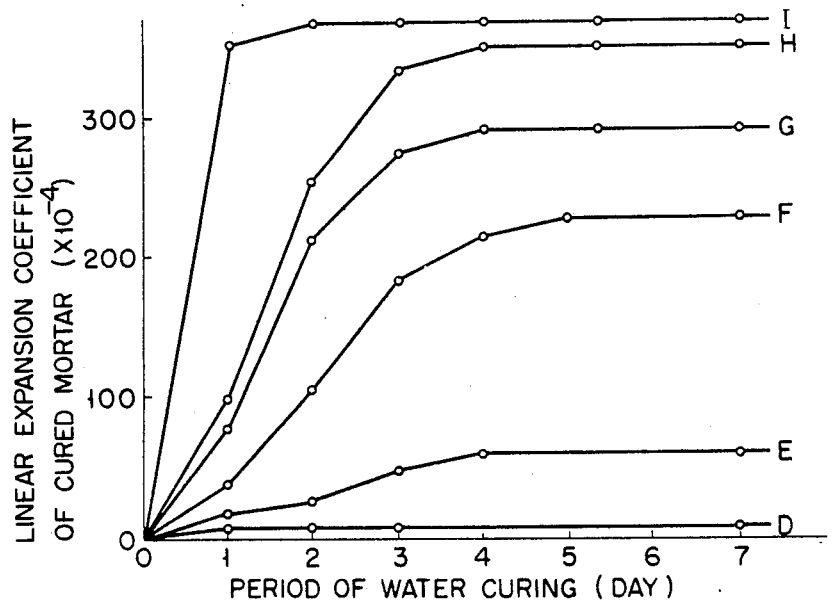
Figure 3:
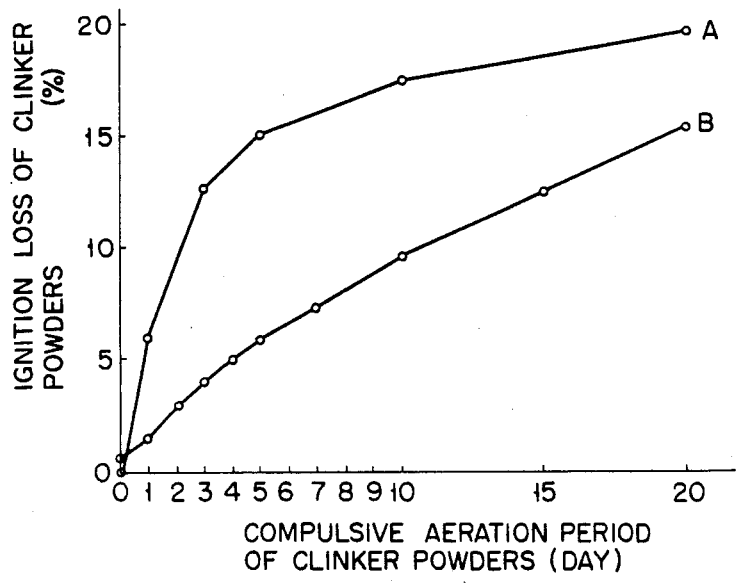
Figure 4:
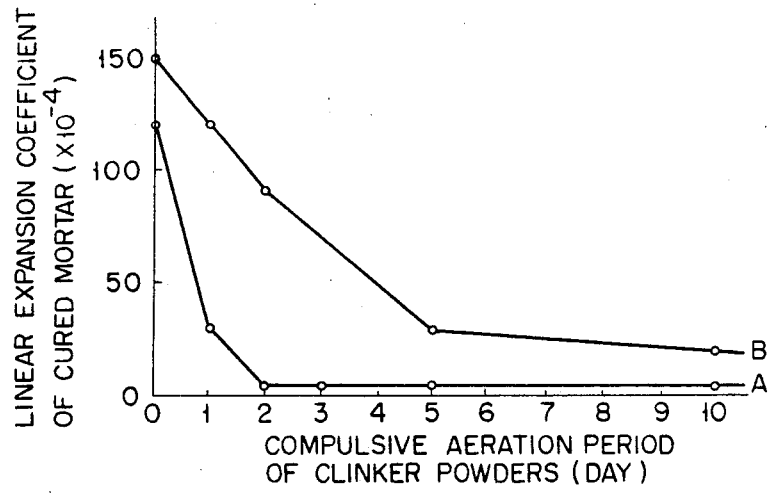
Figure 5:
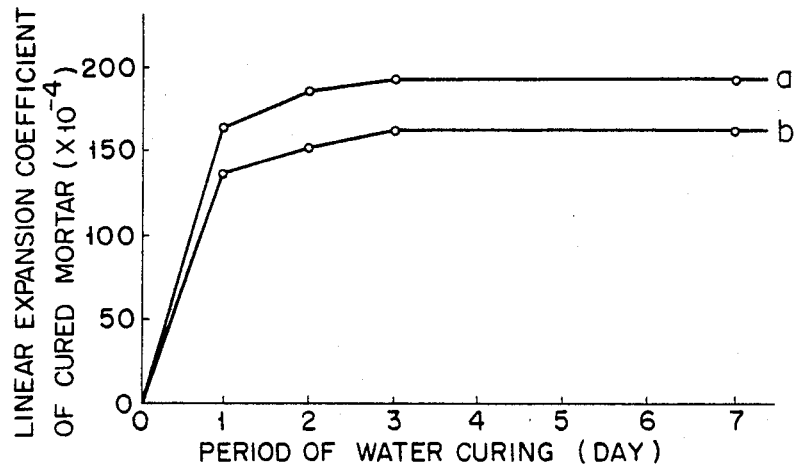

In the Drawings:

FIG. 1 presents three curves showing the relationship between the period of water curing and the linear expansion coefficient of various types of mortar consisting of 95 parts by weight of normal Portland cement and 5 parts by weight of expansive additives of this invention all containing 70 percent by weight (based on the clinker) of CaO crystals having different size distributions;

FIG. 2 indicates five curves showing the relationship between the period of water curing and the linear expansion coefficient of various types of mortar consisting of 90 parts by weight of normal Portland cement and 10 parts by by weight of expansive additives of the invention containing different proportions of CaO crystals whose size distributions all range from 25 to 60 microns;

FIG. 3 illustrates two curves showing the relationship between the period of compulsive aeration applied to the modified clinker powders of the invention including calcium sulfate as another component and the ignition loss of said clinker powders;

FIG. 4 presents two curves showing the relationship between the period of compulsive aeration applied to the modified clinker powders of the invention used in the experiments of FIG. 3 and the maximum linear expansion co-efficient of various types of mortar containing said clinker powders; and FIG. 5 indicates two curves showing the relationship between the period of compulsive aeration applied to the modified clinker powders of the invention used in the experiments of FIG. 3 and the maximum linear expansion coefficient of various types of mortar containing said clinker powders.

There will now be described the process of developing the present invention in connection with several important factors.

I. Experiments with different sizes of CaO crystals dispersed in a vitreous interstitial substance:

There were mixed lime stone, clay, silica stone and copper slag having the chemical compositions shown in Table 1 below in the proportions of 96.6 percent, 2.2 percent, 0.9 percent and 0.3 percent by weight respectively.

Table 1

| Chemical composition of raw materials (wt %) | | | | | | |
|---|---|---|---|---|---|---|
| Raw material | $SiO_2$ | $Al_2O_3$ | $Fe_2O_3$ | CaO | MgO | Ignition loss | Total |
| Lime stone | 1.8 | 0.7 | 0.3 | 53.6 | 0.9 | 42.2 | 99.5 |
| Clay | 60.6 | 19.7 | 7.3 | 1.1 | 2.0 | 7.3 | 98.0 |
| Silica stone | 88.6 | 4.7 | 1.8 | 0.9 | 1.0 | 2.2 | 99.2 |
| Copper slag | 37.4 | 5.0 | 43.9 | 10.3 | 2.0 | −4.9 | 98.6 |

The mixture was pulverized to such extent that a residue on a sieve of 88-micron mesh accounted for 1.5 percent by weight of said mixture. The powdered samples were burned 30 minutes in an electric furnace at three different temperatures given in Table 2 below, obtaining three types of clinker, A, B and C.

Table 2

| | Clinkers obtained | | |
|---|---|---|---|
| Clinker sample | Burning temperature (°C) | Size range of CaO crystals dispersed in a vitreous interstitial substance ($\mu$) | Content of CaO crystals based on the clinker (wt %) |
| A | 1,200 | 10 to 15 | 71.3 |
| B | 1,380 | 15 to 45 | 70.8 |
| C | 1,530 | 25 to 60 | 70.1 |

The clinkers containing about 70 percent by weight of CaO crystals based on the clinker had different size distributions as shown in Table 2 above. The clinkers were pulverized to such extent that 25 percent by weight of said clinkers were retained on a sieve of 88-micron mesh, obtaining three kinds of expansive cement additive. When microscopically observed, the CaO crystals contained in the additives were almost not destroyed.

There were prepared three types of mortar by mixing 95 parts by weight of normal Portland cement, 5 parts by weight of the respective additives obtained, 200 parts by weight of Toyoura standard sand and 60 parts by weight of water. These mortar samples were moulded into a cubical shape of 4cm × 4cm × 16cm. The moulded specimens were cured one day in a curing box kept at a temperature of 20°C and relative humidity of 90 percent. Thereafter the specimens were immersed in the water at 20°C to measure the linear expansion coefficients of demoulded specimens corresponding to the periods of water curing, the results being presented in FIG. 1.

As seen from FIG. 1, the moulded mortar containing the powdered clinker A indicated a maximum linear expansion coefficient of $23 \times 10^{-4}$ when water curing continued only one day, said coefficient later remaining constant. Generally, water curing of only one day does not render the mortar fully hard. Accordingly, the expansion attained at that time failed to provide a chemical prestressing property for the cured mortar specimen. In contrast, when cured with water four and five days respectively, the mortar specimens containing the powdered clinkers B and C indicated maximum linear expansion coefficients of $47.5 \times 10^{-4}$ and $59.5 \times 10^{-4}$ respectively, said values later being kept unchanged. In the case of the clinkers B and C, therefore, water curing continued for three to seven days enabled the mortar specimens to have a chemical prestressing property. Where, however, a moulded mortar indicates a maximum expansion coefficient by water curing of more than seven days, then the mortar may sometimes be destroyed.

It may be expected that if there is obtained a clinker whose CaO crystals can attain a size of more than 60 microns, said clinker would have an expansive property more suitable for chemical prestressing than in the case of the clinker C. In fact, however, there are presented considerable difficulties in developing said CaO crystals into a size of more than 60 microns even when the burning temperature is raised. Therefore, to impart a chemical prestressing property to the mortar, CaO crystals contained dispersed in the vitreous interstitial substance should range between 15 and 60 microns in size.

II. Experiments with different amounts of CaO crystals dispersed in a vitreous interstitial substance:

There were mixed lime stone, clay, silica stone and copper slag having the compositions shown in Table 1 in various proportions given in Table 3 below.

Table 3

| | Clinkers obtained | | | | | |
|---|---|---|---|---|---|---|
| | Mixing ratio of raw materials (wt %) | | | | Burning time (minute) | Content of CaO crystals dispersed in the vitreous interstitial substance (wt % based on the clinker) |
| Clinker sample | Lime stone | Clay | Silica stone | Copper slag | | |
| D | 86.8 | 8.7 | 3.4 | 1.1 | 30 | 25.0 |
| E | 88.0 | 7.9 | 3.1 | 1.0 | 30 | 30.0 |
| F | 92.4 | 5.0 | 1.9 | 0.7 | 30 | 50.3 |
| G | 96.6 | 2.2 | 0.9 | 0.3 | 60 | 70.3 |
| H | 98.6 | 0.9 | 0.4 | 0.1 | 60 | 80.1 |
| I | 99.4 | 0.4 | 0.1 | 0.1 | 60 | 85.7 |

These mixtures were pulverized to such extent that a residue on a sieve of 88-micron mesh accounted for 1.5 percent by weight of said mixtures. The powdered mixtures were burned in an electric furnace at a temperature of 1530°C for the lengths of time shown in Table 3 above, obtaining six clinker samples D, E, F, G, H and I. These clinker samples contained, as shown in Table 3 above, different amounts of CaO crystals whose size distribution in a vitreous interstitial substance ranged between 25 to 60 microns.

The clinker samples D, E, F, G, H and I were pulverized to such extent that 25 percent by weight of the samples was retained on a sieve of 88-micron mesh, obtaining six kinds of expansive cement additive. When microscopically observed, CaO crystals contained in the samples were little destroyed.

There were prepared six mortar specimens by mixing 90 parts by weight of normal Portland cement, 10 parts by weight of the respective clinker samples, 200 parts by weight of Toyoura standard sand and 60 parts by weight of water. The mortar specimens obtained were subjected to the same treatment as described under the previous item I. Measurement was made of the linear expansion coefficients of the demoulded mortar specimens corresponding to the periods of water curing, the results being presented in FIG. 2.

As apparent from FIG. 2, the larger the content of CaO crystals, the higher the linear expansion coefficient of the cured mortar. However, the mortar containing the powdered clinker sample I, whose CaO content was 85.7 percent, presented a maximum linear expansion coefficient of about $350 \times 10^{-4}$ when said mortar was cured about one day with water. Therefore, the powdered clinker I would not enable any mortar to have a chemical prestressing property by the aforementioned reason. On the other hand, the mortar specimen containing the powdered clinker sample D, whose CaO content was 25 percent, showed no sensible expansion coefficient. In contrast, the clinker samples E, F, G and H presented a remarkable maximum expansion coefficient respectively when cured with water four or five days, said value later remaining constant. Accordingly, the content of CaO crystals dispersed in the vitreous substance of the clinker should range from 30 to 80 percent by weight based on the clinker.

The mortar specimens containing the clinker sample C of FIG. 1 and the clinker sample G of FIG. 2 (both containing about 70 percent by weight of CaO crystals) presented widely varying expansion coefficients. This is mainly due to the fact that said clinker samples C and G were added to the mortar specimens in different amounts.

III. Experiments with the mechanical strength of cured mortar:

Even though the cement additives may have a good expansive property, their incorporation in mortar or concrete would lose its significance if said mortar or concrete, when cured, decreased in mechanical strength. Therefore, the present inventor has ascertained by various experiments the effects of the additives of this invention on said mechanical strength.

First, there were prepared a number of clinker samples from mixtures of various proportions of the raw materials having the chemical compositions shown in Table 1 under different burning conditions. From among these clinker samples there were selected those listed in Table 4 below.

The selected clinker samples were pulverized to such extent that about 25 percent by weight of said samples were retained on a sieve of 88-micron mesh. There were mixed 100 parts by weight of the respective powders and 35 parts by weight of water to provide paste specimens. These specimens were each filled in a columnar frame 25mm in inner diameter and 25mm high. The samples were cured one day under a triaxial restraint in an atmosphere kept at a temperature of 20°C and a relative humidity of 90 percent, and further cured three hours in a wet atmosphere at a temperature of 65°C. By way of comparison, experiments were made with normal Portland cement in addition to cured paste specimens containing the aforesaid powdered clinkers under the same conditions as described above. Determination was made of the compressive strength of the cured materials, the results being presented in Table 4 above.

Secondly, there were prepared paste specimens by adding 50 parts by weight of water to 100 parts by weight of a mixture consisting of 7 parts by weight of the powdered clinker samples listed in Table 4 above and 93 parts by weight of normal Portland cement. Experiments were made with the paste specimens obtained under the same conditions as described above. Experiments were also made with normal Portland cement alone in addition to the aforesaid mixtures. Determination was made of the compressive strength of the cured materials, the results being presented in Table 5 below.

Table 4

| Test No. | Clinker powders | Content of CaO crystals in the interstitial substance (wt % based on the clinker) | Compressive strength of cured test pieces (Kg/cm²) | Comparison of compressive strengths |
| --- | --- | --- | --- | --- |
| 1 | (Normal Portland cement alone) | — | 342 | 100 |
| 2 | CaO crystals | 86.1 | 89 | 26 |
| 3 | dispersed in a | 83.6 | 186 | 54 |
| 4 | vitreous inter- | 71.2 | 226 | 66 |
| 5 | stitial substance | 51.6 | 230 | 59 |
| 6 | with a size dis- | 33.2 | 201 | 59 |
| 7 | tribution ranging from 10 to 15 microns | 26.0 | 218 | 64 |
| 8 | CaO crystals dis- | 85.1 | 258 | 75 |
| 9 | persed in a | 80.1 | 362 | 106 |
| 10 | vitreous inter- | 70.3 | 433 | 127 |
| 11 | stitial substance | 50.3 | 440 | 129 |
| 12 | with a size dis- | 30.0 | 421 | 123 |
| 13 | tribution ranging from 25 to 60 microns | 25.0 | 370 | 98 |

Table 5

| Test No. | Clinker powders | Content of CaO crystals in the interstitial substance (wt %) based on the clinker) | Compressive strength of cured test pieces | Comparison of compressive strengths |
| --- | --- | --- | --- | --- |
| 14 | (Normal Portland cement alone) | — | 180 | 100 |
| 15 | CaO crystals dis- | 86.1 | 88 | 49 |
| 16 | persed in a vitre- | 83.6 | 146 | 81 |
| 17 | ous interstitial | 71.2 | 137 | 76 |
| 18 | substance with a | 51.6 | 149 | 83 |
| 19 | size distribution | 33.2 | 149 | 83 |
| 20 | ranging from 10 to 15 microns | 26.0 | 122 | 68 |
| 21 | CaO crystals dis- | 85.1 | 92 | 51 |
| 22 | persed in a vitre- | 80.1 | 212 | 118 |
| 23 | ous interstitial | 70.3 | 218 | 121 |
| 24 | substance with a | 50.3 | 221 | 123 |
| 25 | size distribution | 30.0 | 200 | 111 |
| 26 | ranging from 25 to 60 microns | 25.0 | 176 | 98 |

Thirdly, there were moulded centrifugal unreinforced concrete pipes 15cm in inner diameter, 2.5cm thick and 30cm long from a concrete paste prepared by the mixture of powdered clinkers listed in Table 5 above and normal Portland cement, denoted by Nos. 17, 18, 19, 23, 24 and 25, as a cementitious material under the following conditions:

the maximum size of aggregate—10mm;
the slump—5 to 8cm;
the amount of water added—198Kg/m$^3$;
the amount of cementitious material—417Kg/m$^3$; and
the fine aggregate percentage—46.0 percent.

The concrete pipes still held in the moulds were allowed to stand 3 hours in a room at 20°C, and thereafter were subjected to wet curing in another room at 65°C. Compressive tests were made on the cured pipes thus obtained as well as on those fabricated from normal Portland cement alone as the cementitious material, by applying a load thereto. The magnitudes of load applied to produce an initial crack in the pipes being presented in Table 6 below.

Table 6

| Test No. | Clinker powders | Content of CaO crystals in the interstitial substance (wt % based on the clinker) | Load tests applied to centrifugal unreinforced concrete pipes Magnitude of load applied to produce an initial crack (metric ton/m) | Comparison of load resistance |
|---|---|---|---|---|
| 27 | (Normal Portland cement alone | — | 2.11 | 100 |
| 28 | CaO crystals dispersed in a vitreous interstitial substance with a size distribution ranging from 10 to 15 microns | 71.2 | 1.86 | 88 |
| 29 | | 51.6 | 1.78 | 84 |
| 30 | | 33.2 | 1.87 | 88 |
| 31 | CaO crystals dispersed in a vitreous interstitial substance with a size distribution ranging from 25 to 60 microns | 70.3 | 3.58 | 170 |
| 32 | | 50.3 | 3.21 | 152 |
| 33 | | 30.0 | 2.92 | 138 |

Tables 4, 5 and 6 clearly show the following facts:

1. A cured article, prepared from a paste of clinker powder alone in which CaO crystals dispersed in the vitreous interstitial substance have a size distribution ranging from 10 to 15 microns, and the water bears a ratio of 0.35 to the clinker powder, indicates a compressive strength equal to about 60 to 70 percent of that of a cured article prepared from normal Portland cement alone, regardless of the content of CaO crystals in the clinker. However, where the clinker contains 30 to 80 percent by weight of CaO crystals whose size distribution in the vitreous interstitial substance ranges between 25 to 60 microns, then the resultant cured article will have a greater compressive strength than that obtained from normal Portland cement alone. Especially when the clinker contains 30 to 70 percent by weight of CaO crystals, then the resultant cured article will have a compressive strength about 120 to 130 percent greater than that fabricated from normal Portland cement alone.

2. A cured article, obtained from a pasty mixture consisting of normal Portland cement and 7 percent by weight of clinker powders in which CaO crystals dispersed in the vitreous interstitial substance have a size distribution ranging from 10 to 15 microns and the water bears a ratio of 0.5 to the mixture, has a lower compressive strength than that prepared from normal Portland cement alone, regardless of the content of CaO crystals in the clinker. However, where the clinker contains 30 to 80 percent by weight of CaO crystals whose size distribution in the vitreous interstitial substance ranges between 25 and 60 microns, then the resultant cured article will have a compressive strength about 110 to 120 percent greater than that obtained from normal Portland cement alone.

3. A load to produce an initial crack in a centrifugal unreinforced concrete pipe prepared from cement concrete containing an additive of clinker powders in which CaO crystals dispersed in the vitreous interstitial substance have a size distribution ranging from 10 to 15 microns can be lower than that applied to a similar pipe obtained from normal Portland cement alone, regardless of the content of CaO crystals in the clinker. However, where the clinker contains 30 to 70 percent by weight of CaO crystals whose size distribution in the vitreous interstitial substance ranges between 25 to 60 microns, then a load to produce an initial crack in the resultant pipe will have to be increased to 140 to 170 percent of that required for a pipe obtained from normal Portland cement alone.

Further it was experimentally found that where a pipe was fabricated from a clinkers containing CaO crystals whose size distribution in the vitreous interstitial substance ranged between 15 and 45 microns, there were obtained substantially the same results as in the above-mentioned size distribution ranging from 25 to 60 microns.

IV. Experiments with the fineness of clinker powders:

The clinker powder used in this invention is preferred to have such fineness that a residue on a sieve of 88-micron mesh accounts for 1 to 40 percent by weight of said powders. Where the clinker was pulverized to such fineness that a residue on a sieve of 88-micron mesh accounted for less than 1 percent by weight of said clinker, then a cured mortar consisting of such clinker powder mixed with other materials indicated an extremely low maximum linear expansion coefficient when cured only one day with water. It was also found that where a clinker powders had such fineness that more than 40 percent by weight of the powder was retained on a sieve of 88-micron mesh, then the resultant cured mortar did not attain a maximum linear expansion coefficient even by water curing of three to seven days. Where a residue on a sieve of 88-micron mesh occupied 1 to 30 percent by weight of the clinker powder screened, then a mortar containing such clinker powders never failed to have a maximum expansion coefficient by water curing of three to seven days. However, where a clinker is to be pulverized to such fineness as to cause 1 to 15 percent by weight of said clinker to be retained on the aforementioned sieve, there will be required tremendous energy, resulting in great economic disadvantage. Accordingly, it is most preferred that a clinker used as an additive be pulverized to such fineness as to attain 15 to 30 percent residue on said sieve.

V. Experiments with the amounts of clinker powders to be added to a cement:

Where a cement contained less than 2 percent by weight of an additive of this invention, the mixture, when cured, did not indicate a full chemical prestressing property. Where the addition of said additive exceeded 15 percent by weight, then the mixture could not be expected to present a mechanical strength increase to the extent of such addition, though the mixture indeed obtained a good chemical prestressing property. Therefore, it is desired that the clinker powders of this invention be added to a cement in an amount ranging between 2 to 15 percent by weight based on the mixture.

VI. Conclusion and miscellaneous matters:

As mentioned above, a cement additive containing 30 to 80 percent by weight of a clinker powders in which CaO crystals dispersed in the vitreous interstitial substance have a size distribution ranging from 15 to 60 microns presents, when a cement mixed with this additive is cured, excellent physical properties including the velocity and coefficient of linear expansion and mechanical strength. Therefore, the cement additive of the present invention obviously enables a cured article to have a prominent chemical prestressing property.

As shown in Table 4, a cured paste of the additive of the present invention in which CaO crystals dispersed in the vitreous interstitial substance have a size distribution ranging from 25 to 60 microns presents a greater compressive strength than that obtained from normal Portland cement alone. Accordingly, the above-mentioned clinker powders can also be used as an expansive cement by itself. In this case, it is preferred that a proper amount of gypsum ($CaSO_4 \cdot 2H_2O$) be added to the clinker powders to cause the content of $SO_3$ to account for 1 to 3 percent by weight based on the total amount of the interstitial substance and alite contained in the clinker, thereby regulating the setting of said clinker powders.

Reference has only been made herein to normal Portland cement, but it will be understood that the additives of this invention may be used with other hydraulic cementitious materials such as high early strength Portland cement, blast furnace slag cement, silica cement, white Portland cement, fly ash cement and alumina cement.

VII. Method for producing the additives:

The method for producing the additives of this invention is as follows.

First, there are mixed proper proportions of raw materials of lime, clay and siliceous and ferrous substances such that the mixture has a silica modulus [a weight percentage ratio of $SiO_2\%/(Al_2O_3\% + Fe_2O_3\%)$] ranging from 1.0 to 4.0 and an iron modulus (a weight percentage ratio of $Al_2O_3\%/Fe_2O_3\%$) ranging from 0.5 to 4.0, and contains sufficient amounts of CaO for reaction with $SiO_2$, $Al_2O_3$ and $Fe_2O_3$ to form alite crystals and a vitreous interstitial substance, and also to cause required amounts of CaO crystals to be dispersed in said vitreous interstitial substance.

Then the mixture is burnt long enough at a temperature of 1300° to 1600°C to obtain a clinker, followed by converting all crystals of belite ($2CaO \cdot SiO_2$) formed in the clinker into those of alite. Burning is required to continue about 30 to 60 minutes as shown in Tables 2 and 3. In this case, as the CaO content in the mixed raw materials grows larger, the burning out of the clinker tends to be more difficult. If, in such case, the mixing ratio of raw materials is so adjusted as to reduce the silica modulus in the mixture, namely, to obtain a larger total amount of $Al_2O_3$ and $Fe_2O_3$, and the temperature and time of burning is properly controlled, then the desired clinker will be easily produced. The clinker obtained is pulverized, as previously described, to such fineness that a residue on a sieve of 88-micron mesh accounts for 1 to 40 percent by weight of the clinker. Pulverization to such fineness substantially prevents the CaO crystals dispersed in the vitreous interstitial substance from being destroyed.

VIII. Modified additives of this invention and method for producing the same:

It has been found that even though there may be fixed in the above-mentioned manufacturing method the mixing ratio of raw materials, the fineness of a pulverized mixture of the raw materials, the fineness of the powders of clinker obtained and the amount of the clinker added to mortar and concrete, yet the maximum linear expansion co-efficient of cured mortar or concrete tends to vary with the conditions in which the clinker is burnt, that is, the rate at which a mixture of raw materials is charged into a kiln and the temperature and time of burning. This event gives rise to a certain degree of instability in producing articles of mortar or concrete having a chemical prestressing property exactly as designed.

It has also been disclosed that since cement additives are subject to weathering during long storage, use of such weathered additives will only attain a decreased effect.

As the result of further studies, the present inventor has discovered that additives improved by incorporating gypsum in a mixture of the aforesaid raw materials are not subject to weathering and in consequence give rise to little variation in the maximum linear expansion coefficient and mechanical strength of cured mortar or concrete containing said improved additives.

According to this invention, addition of gypsum (any of $CaSO_4 \cdot 2H_2O$, $CaSO_4 \cdot \frac{1}{2}H_2O$ and $CaSO_4$) to a mixture of the aforesaid raw materials is defined to fall within the range of 10 to 20 percent by weight as converted to $CaSO_4$ based on the total amount of calcium oxide contained in said raw mixture. Where addition of the gypsum fall to below 10 percent, the above-mentioned effect will not be attained. Conversely where said addition exceeds 20 percent, the whole mixture will melt, failing to obtain a clinker in which CaO crystals having a larger size than 15 microns are dispersed in the vitreous interstitial substance.

One important condition of burning a clinker containing gypsum is that burning be stopped before more than 20 percent of the $CaSO_4$ added is decomposed and evaporated. The reason is that decomposition of more than 20 percent will completely eliminate the effect of adding the gypsum.

From among numerous experiments carried out by varying the rate of feeding a mixture of raw materials including gypsum to a rotary kiln and the number of its rotation, there will now be described the clinker samples in which about 35, 50 and 70 percent of calcium oxide crystals by weight based on the clinker are dispersed in the vitreous interstitial substance.

There were mixed the raw materials having the chemical compositions shown in Table 7 below in the proportions given in Table 8 below. These experiments used clay rich in $SiO_2$ and $Fe_2O_3$, omitting silica stone and copper slag.

When the gypsum contained in the mass was partly decomposed and expelled, burning was stopped to obtain a clinker.

Each clinker was pulverized to such fineness that 25 percent by weight of the clinker was retained on a sieve of 88-micron mesh, seven parts by weight of the clinker powders obtained were added to 93 parts by weight of normal Portland cement. To 100 parts by weight of said mixture were further added 200 parts by weight of Toyoura standard sand and 60 parts by weight of water to prepare mortar.

The mortar was filled in a mould of 4cm × 4cm × 16cm and cured one day in a curing box in which there prevailed a wet atmosphere having a temperature of 20°C and a relative humidity of 90 percent. After released from the mould, the cured mortar was further cured by being immersed in the water at 20°C. Measurement was made of the maximum linear expansion coefficient of said cured mortar. Separately, there was prepared a paste containing water bearing the ratio of 0.5. Each mortar was filled in a mould of 25 mm in diameter and 25mm high subjected to a triaxial restraint and cured one day in a curing box containing a wet atmosphere having a temperature of 20°C and a relative humidity of 90 percent. Thereafter the mortar speci- Table 7

| | Chemical composition of raw materials (wt %) | | | | | | | |
|---|---|---|---|---|---|---|---|---|
| Raw material | $SiO_2$ | $Al_2O_3$ | $Fe_2O_3$ | CaO | MgO | $SO_3$ | Ignition loss | Total |
| Lime stone | 1.6 | 0.2 | 0.1 | 55.5 | 0.5 | — | 42.9 | 100.8 |
| Clay | 63.0 | 13.1 | 8.8 | 1.5 | 2.2 | — | 6.4 | 95.0 |
| Anhydrous gypsum | 3.6 | 0.7 | 0.1 | 41.9 | 0.2 | 47.2 | 4.6 | 98.3 |

Table 8

| | Mixing ratio of raw materials (wt %) | | | | | |
|---|---|---|---|---|---|---|
| Raw material | Content of CaO crystals dispersed in the vitreous interstitial substance is about 35 weight % based on the clinker | | about 50 weight % | | about 70 weight % | |
| Lime stone | 87.0 | 82.5 | 92.5 | 85.7 | 96.2 | 87.3 |
| Clay | 13.0 | 12.3 | 7.5 | 6.9 | 3.8 | 3.5 |
| Anhydrous gypsum | 0 | 5.2 | 0 | 7.4 | 0 | 9.2 |

Each mixture of raw materials was pulverized to such fineness that a residue on a sieve of 88-micron mesh accounted for 1.5 percent by weight of the mixture. After 15 percent by weight of water was added to the mixture, the mass was made into pellets 15 to 18mm in diameter using a pan-type pelletizer. The pellets were charged into a rotary kiln 25.5cm in inner diameter, 450cm long and inclined to an extent of 3/100. Burning was carried out by varying the number of revolution of the kiln and the charging rate of mixed raw materials.

men still held in the mould was further cured 3 hours at 65°C in the presence of steam. Measurement was made of the compressive strength of each cured mortar specimen after it was taken out of the mould. In each case, determination was made of the final decomposition degree of the gypsum contained in the clinker. Said determination was effected by comparing the analytical value of $SO_3$ content in the burnt clinker and the $SO_3$ content calculated on the assumption that all the amount of gypsum added still remained in the clinker, the results being expressed as percentage decomposition.

Data obtained from the above-mentioned experiments are presented in Tables 9, 10 and 11 below.

The above Tables 9, 10 and 11 clearly show the following facts.

Where there is used a clinker consisting of mixed raw materials including $CaSO_4$ which, when burnt, causes

Table 9

Experimental data (No. 1)

| Amount of CaO crystals dispersed in the vitreous interstitial substance of a clinker | about 35 per cent by weight | | | | | | | |
|---|---|---|---|---|---|---|---|---|
| Proportion of $CaSO_4$ based on the total CaO content of mixed raw materials | 0 | | | | 15 per cent by weight | | | |
| Burning temperature | 1380°C | | | | 1380°C | | | |
| Number of revolutions of a rotary kiln (r.p.h.) | 20 | | 25 | | 20 | | 25 | |
| Rate of charging mixed raw materials into the kiln (Kg/hr) | 10 | 13 | 10 | 13 | 10 | 13 | 10 | 13 |
| Decomposition degree of $CaSO_4$ (%) | — | — | — | — | 13.6 | 9.0 | 6.8 | 13.6 |
| Maximum linear expansion coefficient of cured mortar ($\times 10^{-4}$) | 36.2 | 25.5 | 41.2 | 19.8 | 68.5 | 61.4 | 63.8 | 66.0 |
| Compressive strength of cured paste (Kg/cm²) | 186 | 181 | 167 | 151 | 182 | 190 | 185 | 192 |

Table 10

Experimental data (No. 2)

| Amount of CaO crystals dispersed in the vitreous interstitial substance of a clinker | about 50 per cent by weight | | | | | | | | | | |
|---|---|---|---|---|---|---|---|---|---|---|---|
| Proportion of $CaSO_4$ based on the total CaO content of mixed raw materials | 0 | | | | 13 per cent by weight | | | | | | |
| Burning temperature | 1500°C | | | | 1500°C | | | | | | |
| Number of revolutions of a rotary kiln (r.p.h.) | 30 | | 35 | | 30 | | 35 | | 20 | | |
| Rate of charging mixed raw materials into the kiln (Kg/hr) | 13 | 15 | 13 | 15 | 9 | 13 | 13 | 15 | 13 | 15 | 20 |
| Decomposition degree of $CaSO_4$ (%) | — | — | — | — | 18.9 | 12.2 | 10.7 | 3.5 | 28.5 | 26.9 | 21.5 |
| Maximum linear expansion co-efficient of cured mortar ($\times 10^{-4}$) | 86.4 | 122.5 | 54.2 | 80.1 | 147.2 | 150.4 | 134.6 | 143.0 | 76.1 | 92.4 | 120.0 |
| Compressive strength of cured paste (Kg/cm²) | 181 | 192 | 150 | 176 | 194 | 196 | 190 | 192 | 161 | 168 | 172 |

Table 11

Experimental data (No. 3)

| Amount of CaO crystals dispersed in the vitreous interstitial substance of a clinker | about 70 per cent by weight |
|---|---|
| Proportion of $CaSO_4$ based on the total CaO content of mixed raw materials | 0                          17 per cent by weight |

Table 11—Continued

Experimental data (No. 3)

| Burning temperature | 1530°C | | | | | | 1530°C | | | | |
| --- | --- | --- | --- | --- | --- | --- | --- | --- | --- | --- | --- |
| Number of revolutions of a rotary kiln (r.p.h.) | 30 | | 35 | | 30 | | 35 | | 20 | | |
| Rate of charging mixed raw materials into the kiln (Kg/hr) | 13 | 15 | 13 | 15 | 13 | 15 | 13 | 15 | 13 | 15 | 20 |
| Decomposition degree of CaSO$_4$ (%) | — | — | — | — | 19.5 | 11.5 | 9.0 | 6.5 | 26.8 | 25.6 | 21.7 |
| Maximum linear expansion coefficient of cured mortar ( × 10$^{-4}$) | 130.6 | 161.1 | 86.9 | 70.2 | 248.8 | 251.6 | 246.1 | 247.0 | 180.3 | 182.8 | 210.1 |
| Compressive strength of cured paste (Kg/cm$^2$) | 181 | 189 | 162 | 156 | 201 | 216 | 199 | 208 | 172 | 185 | 190 | the CaSO$_4$ to be decomposed to a smaller extent than 20 percent, then the maximum linear expansion coefficient of the cured mortar and the compressive strength of the cured paste are prominently larger than when there is used a clinker containing no gypsum, these physical properties being subject to very little variation. In contrast, where there is used a clinker consisting of mixed raw material including CaSO$_4$ which, when burnt, cause the CaSO$_4$ to be decomposed to a larger extent than 20 percent, then the aforesaid linear expansion coefficient and compressive strength present substantially the same degree of variation as when there is used a clinker containing no gypsum.

The reason why addition of gypsum to a clinker attains the above-mentioned effect has not yet been fully understood. However, microscopic observation of thin pieces of clinkers obtained show that CaO crystals dispersed in the vitreous interstitial substance of a clinker containing a proper amount of gypsum had a substantially uniform size, whereas CaO crystals dispersed in the vitreous interstitial substance of a clinker containing no gypsum had uneven sizes and also alite crystals were found to have such a large size as 100 to 200 microns, compared with 50 to 100 microns when gypsum is not used. Further, some parts of the gypsum were observed to be melted in the vitreous interstitial substance, resulting in that the content of said substance is increased to from 10 to 38 weight percent based on the clinker. The aforesaid effect of gypsum is supposed to originate with these factors. The fact that a cured mortar indicated suddenly increased variation in the expansion coefficient and mechanical strength when the gypsum contained therein was decomposed to an extent of about 20 percent at the time of burning is supposed to have been caused by a prominent change in the inner structure of the vitreous interstitial substance of a clinker with the aforesaid decomposition degree of about 20 percent as a turning point.

Determination was made of the weathering characteristics of the clinkers of the present invention pulverized to such fineness that 25 percent by weight of the clinkers was retained on a sieve of 88-micron mesh. Said determination was effected in the following manner. Each clinker powder was spread on a sheet of polyvinyl chloride to a thickness of 2cm. The powder was fully stirred by rocking the sheet occasionally with both ends held by the hands. Thereafter, the powder was subjected to weathering in a room having a temperature of 23°C and a relative humidity of 75 percent. Determination was made of the ignition loss and maximum linear expansion coefficient of cured mortar specimens containing clinker powders which were cured for different numbers of days. These specimens were prepared and cured under the same conditions as previously described.

Two curves A and B of FIG. 3 respectively indicate the relationship between the ignition loss of two clinker samples given in Table 10 and the compulsive aeration period applied thereto. One clinker sample (represented by the curve A) containing no gypsum was used as an additive prepared by charging mixed raw materials at the rate of 15Kg per hour into a rotary kiln revolving at a speed of 30 r.p.h.. The other clinker sample (denoted by the curve B) containing gypsum was prepared by charging mixed raw materials at the rate of 9Kg per hour into a rotary kiln revolving at a speed of 30 r.p.h..

Two curves A and B of FIG. 4 show the relationship between the compulsive aeration period applied to the same clinker samples as those of FIG. 3 and the maximum linear expansion coefficient of cured cement containing said clinker powders.

FIGS. 3 and 4 clearly indicate that the clinker powders containing gypsum (represented by the curve B respectively) have greater resistance to weathering than the clinker powders containing no gypsum (denoted by the curve A respectively).

IX. Examples:

The expansive cement additives of this invention and the method for producing the same will be more fully understood by reference to the following examples.

EXAMPLE 1

There were mixed lime stone, clay, silica stone and copper slag having the chemical compositions shown in Table 1 in the proportions of 96.6, 2.2, 0.9 and 0.3 percent by weight. Said mixing was effected under the following conditions:

Lime saturation degree (weight percentage ratio)
$CaO\%/(SiO_2 \times 2.80 + Al_2O_3\% \times 1.20 + Fe_2O_3\% \times 0.65) = 4.05$
Hydraulic modulus (weight percentage ratio)
$CaO\%/(SiO_2\% + Al_2O_3\% + Fe_2O_3\%) = 8.95$
Silica modulus (weight percentage ratio)
$SiO_2\%/(Al_2O_3\% + Fe_2O_3\%) = 2.05$
Iron modulus (weight percentage ratio)
$Al_2O_3\%/Fe_2O_3\% = 1.71$
Activity index (weight percentage ratio)
$SiO_2\%/Al_2O_3\% = 3.25$ The mixture was pulverized to such fineness that a residue on a sieve of 88-micron mesh accounted for 1.5 percent by weight of said mixture. Some water was added to the pulverized mixture. The mass was made into pellets by a pan-type pelletizer. The pellets were divided into two groups, which were charged into two electric furnaces maintained at 1430°C and 1530°C respectively and burnt 30 minutes. When microscopically observed, the thin pieces of both groups of clinker pellets had alite crystals about 100 microns in size and CaO crystals of various sizes independently dispersed in the vitreous interstitial substance. One group of clinker pellets burned at 1430°C contained 72.0 percent by weight of CaO crystals which indicated a size distribution ranging from 25 to 40 microns in the vitreous interstitial substance. The other group of clinker pellets burned at 1530°C contained 71.7 percent by weight of CaO crystals which presented a size distribution ranging from 25 to 60 microns in the vitreous interstitial substance. Every content of vitreous interstitial substance was about 6 percent by weight based on the clinker.

Clinker pellets of each group were pulverized to such fineness that 25 percent by weight of the pellets was retained on a sieve of 88-micron mesh. There were mixed with full stirring 7 parts by weight of the clinker powders obtained, 93 parts by weight of normal Portland cement, 200 parts by weight of Toyoura standard sand and 60 parts by weight of water to prepare mortar specimens. These specimens were filled in moulds each 4cm × 4cm × 16cm and, under this condition, cured one day in a curing box containing an atmosphere having a temperature of 20°C and a relative humidity of 90 percent. After being taken out of the moulds, the mortar specimens were further cured by being immersed in the water at 20°C for different periods. Determination was made of the linear expansion coefficient of the mortar specimens, the results being presented by curves a and b in FIG. 5, the curve a denoting the mortar specimens containing clinker powders burnt at the temperature of 1530°C, and the curve b representing the mortar specimens containing clinker powders burnt at the temperature of 1430°C.

Next, there were added 50 parts by weight of water to 100 parts by weight of mixtures consisting of cement and clinker powders of each of the aforesaid two groups, thereby preparing two kinds of paste. Each paste was filled in a cylindrical mould of 25mm in diameter and 25mm long. With the mould subjected to a triaxial restraint, that is, tightened on the outside by numerous bolts and nuts so as to prevent the expansion of the charged mass, the mass was allowed to stand one day under this condition in a room at 20°C. Thereafter, the mass still held in said mould was cured 3 hours in a wet atmosphere at 65°C, and later left to cool naturally to room temperature. The cured paste specimens containing clinker powders burnt at 1430°C had a compressive strength of 215Kg/cm², and the cured paste specimens containing clinker powders burnt at 1530°C indicated a compressive strength of 217Kg/cm². By way of comparison, there were prepared cured paste specimens containing no clinker powders, and said specimens presented a compressive strength of 183Kg/cm².

EXAMPLE 2

There were mixed lime stone, clay, silica stone and copper slag having the chemical compositions shown in Table 1 in the proportions of 90.2, 6.5, 2.5 and 0.8 percent by weight. The mixture was pulverized to such fineness that 2.0 weight percent of said mixture was retained on a sieve of 88-micron mesh. A paste prepared by adding some water to the mixture was made into pellets of 15 to 20mm in diameter by a pan-type pelletizer. The pellets were burnt in a rotary kiln 8.34 meters long, 0.45 meter in inner diameter, inclination of 5/100 and revolving at a speed of 50 r.p.h.. When microscopically observed, the thin pieces of said burnt clinker had no belite crystals, but alite crystals dispersed in the vitreous interstitial substance with a size distribution ranging from 50 to 100 microns and CaO crystals dispersed in said vitreous interstitial substance with a size distribution ranging from 25 to 60 microns. The clinker contained 40.2 percent by weight of CaO crystals based on the clinker.

The pellets obtained were pulverized to such fineness that 25 percent by weight of the clinker powders was retained on a sieve of 88- micron mesh. There were prepared concrete specimens by mixing 9 parts by weight of the clinker powders and 91 parts by weight of normal Portland cement under the following conditions:

Maximum size of aggregate — 10mm
Slump — 7cm
Water — 198Kg/m³
Mixed cementitious materials — 417Kg/m³
Fine aggregate percentage — 46 percent The concrete thus prepared was made into double reinforced centrifugal concrete pipes of 110cm in inner diameter, 8.8cm thick and 2.43 meter long, with the steel ratio of 0.43. While held in moulds, the concrete pipes were allowed to stand 3 hours in a room at 20°C, and later cured 3 hours in another wet room at 65°C. After the moulds were left to cool naturally to room temperature, the concrete pipes were taken out, and later cured 7 days in the water at 20°C. The cured concrete pipes were put to a test of determining a magnitude of load to produce an initial crack therein, the required load being 6.7 metric tons per meter. By way of comparison, there was prepared a concrete pipe containing no clinker powders. A load required to produce an initial crack in said pipe was 3.9 metric tons per meter.

The concrete prepared, as previously described, with addition of the clinker powders was filled in a mould of 10cm × 10cm × 40cm size. The specimen was allowed to stand one day in a room at 20°C, and cured under the same conditions as the aforesaid pipes after being taken out of the mould. The specimen had a linear expansion coefficient of 60.1 × 10⁻⁴. By way of comparison, there was prepared a specimen without addition of clinker powders. This specimen indicated a linear expansion coefficient of only 2.1 × 10⁻⁴.

EXAMPLE 3

There were mixed lime stone, clay and anhydrous gypsum having the chemical compositions shown in Table 7 in the proportions of 85.7, 6.9 and 7.4 percent by weight respectively. The content of CaSO₄ in the mixture accounted for 13 percent by weight based on the total content of CaO. The mixture was pulverized to such fineness that the residue on a sieve of 88-micron mesh amounted to 2 percent of said mixture. A paste prepared by adding some amounts of water to the pulverized mixture was made into pellets by a pan-type pelletizer. The pellets were burned at 1500°C at the rate of 1 metric ton per hour in a rotary kiln of 20 meters of length and 1.5 meters of inner diameter, inclined to an extent of 2/100 and revolving at a speed of 35 r.p.h. At this burning temperature, there were evolved only small amounts of purple fumes by decomposition of the gypsum contained in the aforesaid mixture. The clinker delivered from the kiln contained about 50 percent by weight of CaO crystals and about 16 percent by weight of vitreous interstitial substance based on the clinker.

From the clinker continuously drawn out of the rotary kiln were sampled 20 lots each of about 2Kg at an interval of 2 hours. Each lot was pulverized to such fineness that a residue on a sieve of 88-micron mesh accounted for 20 percent by weight of said lot. There were mixed 7 parts by weight of the clinker powders obtained, 93 parts by weight of normal Portland cement, 200 parts by weight of Toyoura standard sand and 60 parts by weight of water to prepare a mortar. The mortar was filled in moulds of 4cm × 4cm × 16cm and cured one day in a curing box containing an atmosphere having a temperature of 20°C and a relative humidity of 90 percent. After being released from the moulds, the mortar specimens were further cured in water at 20°C. Determination was made of the maximum linear expansion coefficient of said specimens. The average thereof was 126.6 × 10⁻⁴, and the coefficient of variation was 8.3 percent.

There was prepared a paste under the same conditions as described above excepting that the water was added in the ratio of 0.5 to the total amount of cementitious materials. The paste was cured by being filled in a mould subjected to a triaxial restraint as in Example 1. The compressive strength of said specimen was 184kg/cm² with a coefficient of variation of 2.6 percent.

By way of comparison, there were prepared paste specimens by mixing lime stone and clay in the proportions of 92.5 and 7.5 percent by weight respectively without using gypsum. The same experiments described above were made with the cured paste specimens obtained, which showed the average maximum linear expansion coefficient of 102.1 × 10⁻⁴ with a prominently wide coefficient of variation of 43.1 percent, and the average compressive strength of 170Kg/cm² with a coefficient of variation of 7.6 percent.

What is claimed is:

1. An expansive cement additive of pulverized clinker containing alite crystals and calcium oxide crystals dispersed in a vitreous interstitial substance consisting of substantially two phases of 4CaO·Al₂O₃·Fe₂O₃ and 3CaO·Al₂O₃, wherein the ranges of crystal sizes of said alite and calcium oxide are 50 to 100 microns and 15 to 60 microns respectively, the content of the calcium oxide crystals in the vitreous interstitial substance being in a range of from 30 to 80 percent by weight based on the clinker, and the amount of said vitreous interstitial substance in the clinker being in a range of from 2 to 27 percent by weight based on the clinker.

2. An expansive cement additive of pulverized clinker containing alite crystals and calcium oxide crystals dispersed in a vitreous interstitial substance consisting of substantially three phases of 4CaO·Al₂O₃·Fe₂O₃, 3CaO·Al₂O₃ and CaSO₄, the ranges of crystal size of said alite and calcium oxide being 100 to 200 microns and 15 to 60 microns respectively, the content of the calcium oxide crystals in the vitreous interstitial substance being in a range of from 30 to 80 percent by weight based on the clinker, and the amount of said vitreous interstitial substance in the clinker being in a range of from 10 to 38 percent by weight based on the clinker.

3. The expansive cement additive of claim 1, wherein the size range of said calcium oxide crystals is from 25 to 60 microns.

4. The expansive cement additive of claim 2, wherein the size range of said calcium oxide crystals is from 25 to 60 microns.

5. The expansive cement additive of claim 1, wherein the pulverized clinker has such fineness that 1 to 40 percent by weight of said clinker is retained on a sieve of 88-micron mesh.

6. The expansive cement additives of claim 2, wherein the pulverized clinker has such fineness that 1 to 40 percent by weight of said clinker is retained on a sieve of 88-micron mesh.

7. The expansive cement additives of claim 1, wherein the pulverized clinker has such fineness that 15 to 30 percent by weight of said clinker is retained on a sieve of 88-micron mesh.

8. The expansive cement additives of claim 2, wherein the pulverized clinker has such fineness that 15 to 30 percent by weight of said clinker is retained on a sieve of 88-micron mesh.

9. A process for producing expansive cement additives which comprises;

mixing raw materials of lime, clay and siliceous and ferrous substances, said mixing being so effected as to obtain a silica modulus, a weight percentage ratio of $SiO_2\%/(Al_2O_3\% + Fe_2O_3\%)$, ranging from 1.0 to 4.0 and an iron modulus, a weight percentage ratio of $Al_2O_3\%/Fe_2O_3\%$, ranging from 0.5 to 4.0, and causing the mixture to contain a sufficient amount of calcium oxide for reaction with silicon oxide, aluminum oxide and ferric oxide in addition to the amount thereof to remain as free calcium oxide crystals; burning the mixture of raw materials long enough at a temperature ranging from 1300° to 1600°C to obtain a clinker having no belite crystals therein; whereby a vitreous interstitial substance and alite and calcium oxide crystals dispersed in said vitreous interstitial substance are formed in the clinker; and pulverizing the clinker to such fineness that 1 to 40 percent by weight of said clinker is retained on a sieve of 88-micron mesh.

10. The process according to claim 9, wherein, in the mixing step, the amount of calcium oxide to remain as free calcium oxide crystals to be dispersed in the vitreous interstitial substance formed in the clinker ranges from 30 to 80 percent by weight of the clinker.

11. The process according to claim 9, wherein the mixture of raw materials includes 10 to 20 percent of gypsum as converted to $CaSO_4$ based on the total amount of calcium oxide contained in said mixture; and burning of said mixture is stopped before 20 percent by weight of the gypsum added is decomposed.

12. The process according to claim 9, wherein the gypsum is one selected from the group consisting of $CaSO_4 \cdot 2H_2O$, $CaSO_4 \cdot \frac{1}{2}H_2O$ and anhydrous calcium sulfate.

* * * * *

UNITED STATES PATENT OFFICE
CERTIFICATE OF CORRECTION

Patent No. 3,785,844            Dated January 15, 1974

Inventor(s) Toshio Kawano

It is certified that error appears in the above-identified patent and that said Letters Patent are hereby corrected as shown below:

Column 1, line 11 - delete "agnet" and replace with

--- agent ---.

Column 1, line 49 - delete "$C_4Af$" and replace with

--- $C_4AF$ ---.

Columns 5 and 6 - Table 5 - insert a solid line between

Test Nos. 14 and 15 and Test Nos.

20 and 21.

Column 7 - Table 6 - insert a solid line between Test

Nos. 27 and 28 and Test Nos. 30 and 31.

Column 2, line 16 - after "indicates", delete "five" and replace with ---six---.

Column 2, lines 36-40 - delete "compulsive aeration... clinker powders." and replace with ---water curing and linear expansion coefficient of two types of mortar containing the clinker powders prepared from clinkers burnt on different condition in Example 1. ---.

Columns 5 and 6 - Table 5 - Fourth column of Table - after "pieces" insert ---($Kg/cm^2$)---.

Signed and sealed this 15th day of April 1975.

(SEAL)
Attest:

RUTH C. MASON
Attesting Officer

C. MARSHALL DANN
Commissioner of Patents
and Trademarks